Figure 1:
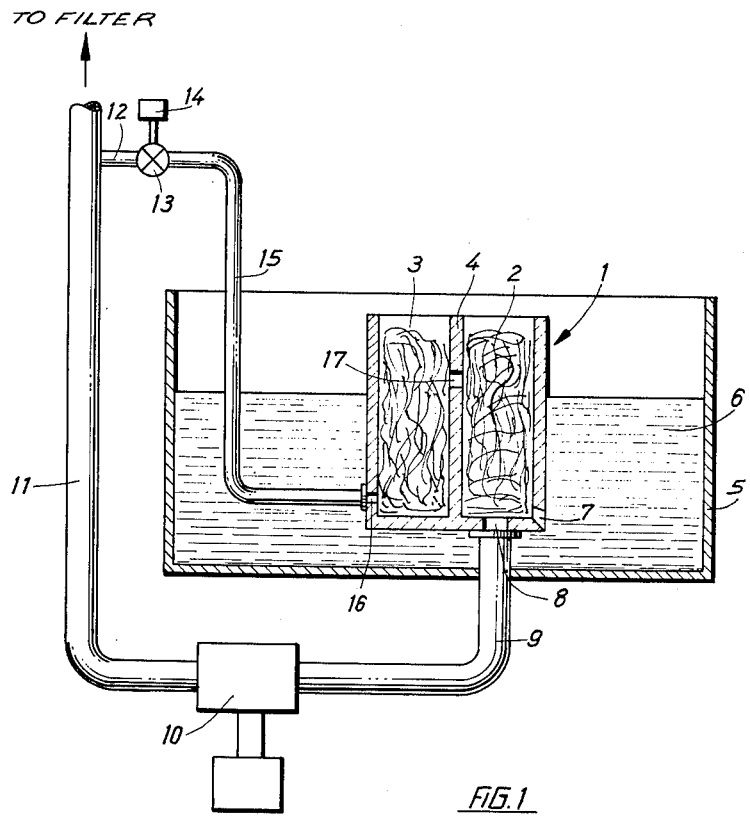

INVENTOR.
HEINRICH FÜHRING
BY
ATTORNEY

3,255,770
APPARATUS FOR THE CHARGING AND REPLENISHING OF AUXILIARY FILTERING AGENTS FOR SEDIMENTATION FILTERS

Heinrich Führing, Augsburg, Germany, assignor to Max Böhler and Ferdinand Weber, both of Augsburg, Germany
Filed Oct. 25, 1962, Ser. No. 233,076
Claims priority, application Germany, Oct. 27, 1961, B 64,565
4 Claims. (Cl. 137—268)

The invention relates to a charge replenishment and feed apparatus for sedimentation filters in dry-cleaning machines, by which devices an auxiliary filtering agent which is provided in a double-chamber-type container is selectively delivered to the liquid flowing to the sedimentation filter.

In dry-cleaning machines which operate by the single-batch method, the auxiliary filtering agent consisting generally of kieselguhr, is usually added in the needle dispenser to the solvent which is drawn by a pump from the cleaning drum and fed to the sedimentation filter.

When the multiple-batch method is employed, part of the auxiliary filtering agent is added to first to cause primary sedimentation. Then a determined further quantity of the agent is added in order to ensure that the sludge on the sedimentation-filter is continually agitated. If such supplementary addition were omitted, the accumulating sludge would form a layer which would be impervious to the solvent.

In numerous filtering processes, the problem of charging and replenishment has been solved in many ways involving the use of complex and expensive equipment.

Thus, for example, it is known to use a device for admixing a powder or a fibrous auxiliary filtering agent with a flowing liquid, which device comprises a container for the pulverulent substance mixed with liquid, and a device which causes the material to be carried away by a flowing liquid; inserted in the container is a basket-like insert which is connected to a feed branch which is branched-off from the main liquid-pipe, and a discharge branch which is returned to the feed branch.

It is also known to provide an apparatus for the quantitatively controlled supply of auxiliary filtering substances and the like to a liquid flowing through a main liquid pipe from a flotation-and-storage tank, preferably for the filtration of impurities or for the purification of sewage by filtering, in which a supply of auxiliary filtering material is kept in reserve in the interior of the flotation-and-storage tank until towards the end of the filtering process, and is then added to the liquid to be filtered towards the end of the filtering process for the purpose in increasing the concentration of auxiliary filtering material.

It is furthermore known for the quantitatively controlled feeding of auxiliary filtering agents to provide means having containers with a plurality of compartments in which various kinds of auxiliary filtering material of any nature are stored. It is also known to provide the tanks and containers with stirrers in order thus to permit a quantitatively controlled feed of a particular kind.

All of these known devices require, however, too much equipment, and are too costly, apart from being highly unsuitable for use in dry-cleaning machines, in which it is of importance that the charging should be as simple as possible than that the charging device should occupy the minimum of space. It is an object of the invention to permit the addition of a specific but variable quantity at any time.

In accordance with the invention, this object is achieved by a charging device, the basic construction of which is such that a first compartment of a container which contains the auxiliary filtering agent for the primary sedimentation is connected by a closed conduit to a feed pump, and, through at least one opening provided in a wall of the otherwise closed container, is in communication with the liquid surrounding the container, and, finally, is in communication with a second compartment containing the reserve auxiliary filtering agent through a replenishment opening provided in the partition between the first and second compartments of the container.

By reason of the fact that a flow is produced from the container for the liquid through the first compartment for the addition of filtering agent for primary sedimentation to the feed conduit of the pump, it is ensured that the filtering agent forming the primary sediment may be fed to the sedimentation filter without difficulty, and without the auxiliary filtering agent being lost to the primary sediment in spite of the opening in the wall of the container being provided. Furthermore, by the arrangement according to the invention it is ensured that the reserve auxiliary filtering agent is not added to the flow of liquid directly, but is first quantitatively controlled by the replenishment opening provided in the partition between the first and second compartments of the container.

One particular advantage of the invention consists in that the filter powder is introduced into the compartments together with the solvent added thereto, so that the stirrers otherwise required for the known charging devices by which a continuous flow of the dry filtering powder was to be ensured, may now be dispensed with.

The double-chamber container extends advantageously into the base tank containing the dry-cleaning agent, since it is thus unnecessary to provide additional space for the charging device according to the invention by reason of the fact that dry-cleaning machines are generally provided with a base tank which is operated by the multi-charge method.

In accordance with the invention, the container compartment for the addition of the filtering agent forming the primary sediment is in communication with the surrounding liquid through an opening provided in the wall at a position close to the bottom of the compartment. In this way, it is achieved that the total, uniformly distributed auxiliary filtering agent forming the primary sediment is fed to the filter.

It has been found to be particularly advantageous to provide, if possible at a position in the lower part of the container compartment containing the reserve auxiliary filtering agent, a liquid pressure pipe which may be closed by a valve. The provision of this pressure pipe enables the formation of deposits in the container-compartment for the reserve auxiliary agent to be effected when desired with resulting replenishment of the compartment for the addition of the primary agent through the opening provided in the partition of the container. Since the closure of the pressure pipe may be operated at any desired moment, and may be maintained open for any length of time, the time of replenishment and the amount transferred may be controlled as desired. The pressure pipe may advantageously be branched-off from the pipe-section between the pump and the filter to form a by-pass, and may be closed by controlled shut-off valve. Furthermore, the opening in the partition is advantageously provided at a level slightly above the surface of the liquid in the first compartment.

An additional advantage afforded by the invention results from the fact that the solvent fed through the pressure pipe is accelerated by means of nozzles or a lateral jet by which the formation of deposits is improved.

The jet, advantageously distributed in form of a fan, is passed along the base of the compartment and thus removes the reserve auxiliary filtering agent from underneath and washes it away.

This feature and further features of the invention are illustrated in the drawings, in which the invention is diagrammatically illustrated with reference to one construction which is shown by way of example in FIGURES 1 and 2.

Figure 2:
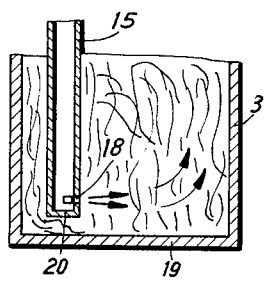

FIGURE 1 is a sectional elevation of the charging and replenishment tank 1 which contains two compartments 2, 3 which are separated by a partition 4. The compartment 2 contains that auxiliary filtering agent which is to be fed to the filter together with the primary sediment. The compartment 3 contains the reserve auxiliary filtering agent of which optional controlled quantities are used to replenish compartment 2 as required at any desired moment. The tank 1 is disposed within a larger basic container 5, which in dry-cleaning machines, is frequently referred to as a "base tank" and contains the solvent 6. An opening 7 is provided adjacent a bottom wall so that the compartment 2 and the interior of the tank 5 are in communication. The pump 10 draws solvent 6 through the opening 7 into the compartment 2, in which the liquid is enriched with powder and from which it flows through an opening 8 into a suction pipe or conduit 9. The solvent, enriched with auxiliary filtering agent, is then fed to the filter through a standpipe 11. The flow thus produced prevents the auxiliary filtering agent in the compartment 2 from issuing from the opening 7 by reason of the fact that a countercurrent flow obtains in the opening 7. The reserve auxiliary agent present in compartment 3 is supplied through an opening 17 provided in the partition 4 of the compartment. In one preferred construction, the opening 17 is disposed at a level above the surface of the solvent 6 in the tank 5. Thus, no reserve auxiliary agent can be discharged, since the compartment 3 is otherwise completely closed. It is only when liquid is introduced by the pressure pipe 15 through the opening 16 into the compartment 3 adjacent a bottom wall that deposits of auxiliary filtering agent form from below with resulting replenishment of the said agent through the opening 17 into the compartment 2. In the illustrated construction, the pressure pipe 15 is closed by a controllable shut-off valve 13, so that normally the liquid present in the standpipe 11 is unable to flow into the compartment 3. It is only when the valve 13 is opened by a control device 14, that the liquid in the standpipe 11 flows through the pressure pipe 15 into the compartment 3 with resulting replenishment of compartment 2. By operating the valve 13, therefore, the moment of replenishment may be controlled. The quantities supplied may be controlled by the period of time during which the valve 13 remains open.

It will be readily understood that the control device 14 may be readily inserted into the automatic circulation of a dry-cleaning machine, so that a predetermined quantity of reserve auxiliary filtering agent may be supplied for each charge. In view of the fact that the control of the valve 13 may be corrected automatically or manually, it is, moreover, possible to increase, reduce, or even omit the predetermined quantity supplied.

It will also be readily understood that the construction which is diagrammatically illustrated by way of example in the drawings, may be modified in many ways. Thus, for example, the tank 1 may be connected by a pressure pipe to the tank 5 for the solvent provided at a different position, that is to say, the container 1 need not necessarily be provided in the base tank 5, although such arrangement would save space. Furthermore, the dimensions and number of openings 7 and 17 provided are not of decisive importance. It is, however, important that the opening should permit the inflow of solvent into the compartment 2 and at the same time prevent a discharge of auxiliary filtering agent.

The solvent should flow at an increased velocity into the reserve compartment 3 at a position as close as possible to the base of the compartment. Thus, for example, as shown in FIGURE 2, nozzle-like outlets 18 may be provided or an impinging flow may be produced by directing the outlet against the bottom 19 of the compartment. The pressure pipe 15 may also be introduced downwardly into the compartment 3 thus saving the connections otherwise required. By providing in the wall of the pipe at a position close to its end 20 a slot or outlet 18 extending transversely to its axis, the solvent will issue at an increased velocity from the slot or outlet 18 to form a fan parallel to the base 19 of the compartment, so that the reserve auxiliary filtering agents is removed from underneath and washed away.

Thus, the invention is not limited to the embodiment illustrated, and includes any modification based thereon.

I claim:

1. Apparatus for charging and replenishing the solvent used in dry-cleaning apparatus having a filter with a filter substance comprising, in combination:
   a tank containing a solvent for use with said dry-cleaning apparatus;
   a container having a bottom wall and having disposed therewithin a primary and an auxiliary charge of filtering substance positioned within said tank, and comprising:
   a first compartment in which said primary charge is disposed having an aperture adjacent the bottom wall thereof fluidly communicating said tank with said first compartment;
   a second compartment in which said auxiliary charge of filtering substance is disposed; and
   a vertically extending partition separating said first and second compartments, having an aperture therethrough fluidly communicating said compartments with one another;
   the aperture in said partition being disposed at a location above the level of the solvent within the tank;
   a forced-flow circuit for conveying the solvent admixed with said filtering substance to the filter of said dry-cleaning apparatus comprising:
   a conduit connected to the interior of said first compartment through the bottom wall thereof, said conduit having a stand-pipe adapted to be connected to the filter of said dry-cleaning apparatus;
   a pump disposed in said conduit causing the flow of solvent in the tank through the aperture into said first compartment, in which it will be admixed with said primary charge of filtering substance, and then through said standpipe; and
   a branch-pipe connected to and extending from said stand-pipe to said second compartment, and terminating in a horizontally extending opening within said second compartment and adjacent the bottom wall thereof for directing the solvent horizontally into said second compartment, said branch-pipe having:
   a shut-off valve for controlling the quantity of solvent to be conveyed to said second compartment from the stand-pipe and the time interval for the effectuation thereof.

2. Apparatus as defined in claim 1, wherein:
   said branch further comprises:
   an outlet connecting said branch with said second compartment, and being constructed and arranged to substantially define at least one nozzle.

3. Apparatus as defined in claim 1, wherein:
   said branch further comprises:
   an outlet for connecting with said second compartment;
   said outlet being constructed and arranged to produce a lateral jet outflow.

4. Apparatus as defined in claim 1, wherein:
said branch further comprises:
   an outlet for connecting with said second compartment; and
   said outlet being constructed and arranged to produce a rebounding outflow.

References Cited by the Examiner

UNITED STATES PATENTS

| | | | |
|---|---|---|---|
| 1,045,830 | 12/1912 | Gates | 210—189 X |
| 1,608,661 | 11/1926 | Nordell | 210—189 X |
| 1,624,614 | 4/1927 | McGill | 210—189 |
| 1,981,645 | 11/1934 | Gans | 210—75 X |
| 2,046,845 | 7/1936 | Raisch | 210—75 X |
| 2,210,719 | 8/1940 | Hodges | 210—193 X |
| 2,219,208 | 10/1940 | Knight | 222—193 |
| 3,037,635 | 6/1962 | Boorujy | 210—75 X |
| 3,064,816 | 11/1962 | Griswold | 210—193 X |
| 3,100,191 | 8/1963 | Smith et al. | 210—193 |

FOREIGN PATENTS 576,118   5/1933   Germany.

REUBEN FRIEDMAN, *Primary Examiner.*

ROBERT F. BURNETT, *Examiner.*

D. E. TALBERT, JR., *Assistant Examiner.*